United States Patent
Fan et al.

(10) Patent No.: US 8,429,202 B2
(45) Date of Patent: Apr. 23, 2013

(54) METHODS AND APPARATUS FOR PROPAGATING FUNCTIONAL DEPENDENCIES WITH CONDITIONS

(75) Inventors: Wenfei Fan, Wayne, PA (US); Ming Xiong, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 695 days.

(21) Appl. No.: 12/474,686

(22) Filed: May 29, 2009

(65) Prior Publication Data

US 2010/0306279 A1    Dec. 2, 2010

(51) Int. Cl.
*G06F 17/30* (2006.01)

(52) U.S. Cl.
USPC ...................................................... 707/803

(58) Field of Classification Search .................. None
See application file for complete search history.

(56) References Cited

U.S. PATENT DOCUMENTS 6,513,038 B1 *   1/2003   Hasegawa et al. ............ 707/752

OTHER PUBLICATIONS

Fan et al., "Propagating Funcational Dependencies with Conditions", PVLDB, Auckland, New Zealand, Aug. 23-28, 2008.
Gottlob, Georg, "Computing Covers for Embedded Functional Dependencies", Proc. of Principles of Database Systems (PODS) (1987).

* cited by examiner

*Primary Examiner* — Bai D. Vu
(74) *Attorney, Agent, or Firm* — Ryan, Mason & Lewis, LLP (57) ABSTRACT

Methods and apparatus are provided for propagating functional dependencies with conditions. Propagation covers are computed using an SPC view of a dataset, wherein the SPC view comprises selection, projection and Cartesian product operations. Selection operations are processed to extract equivalence classes. Cartesian product operations are processed to obtain a renamed set of the plurality of conditional functional dependencies, that have attributes appearing in the SPC view. Domain constraints from the equivalence classes are applied to the renamed set to remove attributes not in the SPC view. Projection operations are processed using a reduction by resolution procedure to identify inferences that can be propagated to the SPC view from the conditional functional dependencies having attributes that do not appear in the SPC view. Domain constraints of the equivalence classes are converted to conditional functional dependencies; and a minimal cover of the SPC view is determined.

18 Claims, 5 Drawing Sheets

200

| Σ | VIEW LANGUAGE | COMPLEXITY BOUNDS ||
|---|---|---|---|
| | | INFINITE DOMAIN ONLY | GENERAL SETTING |
| | PROPAGATION FROM FDs TO CFDs |||
| FDs | SP | PTIME | PTIME |
| | SC | PTIME | coNP-COMPLETE |
| | PC | PTIME | PTIME |
| | SPC | PTIME | coNP-COMPLETE |
| | SPCU | PTIME | coNP-COMPLETE |
| | RA | UNDECIDABLE | UNDECIDABLE |
| | PROPAGATION FROM CFDs TO CFDs |||
| CFDs | S | PTIME | coNP-COMPLETE |
| | P | PTIME | coNP-COMPLETE |
| | C | PTIME | coNP-COMPLETE |
| | SPC | PTIME | coNP-COMPLETE |
| | SPCU | PTIME | coNP-COMPLETE |
| | RA | UNDECIDABLE | UNDECIDABLE |

FIG. 1

(a) INSTANCE $D_1$ OF $R_1$, FOR UK CUSTOMERS

| | AC | PHN | NAME | STREET | CITY | ZIP |
|---|---|---|---|---|---|---|
| $t_1$: | 20 | 1234567 | MIKE | PORTLAND | LDN | W1B 1JL |
| $t_2$: | 20 | 3456789 | RICK | PORTLAND | LDN | W1B 1JL |

(b) INSTANCE $D_2$ OF $R_2$, FOR US CUSTOMERS

| | AC | PHN | NAME | STREET | CITY | ZIP |
|---|---|---|---|---|---|---|
| $t_3$: | 610 | 3456789 | JOE | COPLEY | DARBY | 19082 |
| $t_4$: | 610 | 1234567 | MARY | WALNUT | DARBY | 19082 |

(c) INSTANCE $D_3$ OF $R_3$, FOR CUSTOMERS IN NETHERLANDS

| | AC | PHN | NAME | STREET | CITY | ZIP |
|---|---|---|---|---|---|---|
| $t_5$: | 20 | 3456789 | MARX | KRUISE | AMSTERDAM | 1096 |
| $t_6$: | 36 | 1234567 | BART | GROTE | ALMERE | 1316 |

FIG. 2

| Σ | VIEW LANGUAGE | COMPLEXITY BOUNDS ||
| --- | --- | --- | --- |
| | | INFINITE DOMAIN ONLY | GENERAL SETTING |
| PROPAGATION FROM FDs TO CFDs ||||
| FDs | SP | PTIME | PTIME |
| | SC | PTIME | coNP-COMPLETE |
| | PC | PTIME | PTIME |
| | SPC | PTIME | coNP-COMPLETE |
| | SPCU | PTIME | coNP-COMPLETE |
| | RA | UNDECIDABLE | UNDECIDABLE |
| PROPAGATION FROM CFDs TO CFDs ||||
| CFDs | S | PTIME | coNP-COMPLETE |
| | P | PTIME | coNP-COMPLETE |
| | C | PTIME | coNP-COMPLETE |
| | SPC | PTIME | coNP-COMPLETE |
| | SPCU | PTIME | coNP-COMPLETE |
| | RA | UNDECIDABLE | UNDECIDABLE |

*FIG. 3*

*Input*: Source CFDs $\Sigma$, and SPC view $V = \pi_Y(E_s)$, $E_s = \sigma_F(E_c)$.
Output: A minimal propagation cover of $\Sigma$ via $V$.

1.  $\Sigma_V := \emptyset$;   $\Sigma := \text{MinCover}(\Sigma)$;
2.  EQ := ComputeEQ($E_s, \Sigma$);   /* handling $\sigma_F$ */
3.  if EQ = $\perp$   /* inconsistent */
4.  then return $\{R_V(A \rightarrow A, (\_ \parallel a)), R_V(A \rightarrow A, (\_ \parallel b))\}$;
    /* for some $A \in Y$, distinct $a, b \in \text{dom}(A)$ */
5.  for each $R_j = \rho_j(S)$ in $E_c$ do
6.      $\Sigma_V := \Sigma_V \cup \rho_j(\Sigma)$;   /* handling product 'x' */
7.  for each eq $\in$ EQ do   /* applying domain constraints */
8.      pick an attribute rep(eq) in eq
          such that rep(eq) $\in Y$ if eq $\cap Y$ is not empty;
9.      substitute rep(eq) for each $A \in$ eq, in $\Sigma_V$;
10.     eq := eq $\cap Y$;   /* keep only those attributes in $Y$ */
11. $\Sigma_c := \text{RBR}(\Sigma_V, \text{attr}(E_s) - Y)$;   /* handling $\pi_Y$ */
    /* attr($E_s$) is the set of attributes in $E_s$ */
12. $\Sigma_d := \text{EQ2CFD(EQ)}$; /* put domain constraints as CFDs */
13. return MinCover($\Sigma_c \cup \Sigma_d$);

FIG. 4

*Input*: An attribute set $X = U - Y$, and a set $\Sigma$ of CFDs on $U$.
*Output*: A cover $\Gamma$ of $\Sigma^+[Y]$.

1.     let $\Gamma := \Sigma$;
2.     while $X$ is not empty do {
3.         pick $A \in X$; $X := X - \{A\}$; $C := \emptyset$;
4.         for each CFD $(W \rightarrow A, t_1) \in \Gamma$ do
5.             for each CFD $(AZ \rightarrow B, t_2) \in \Gamma$ do
6.                 if $t_1[A] \preceq t_2[A]$ and $t_1[W] \oplus t_2[Z]$ is well defined
7.                   then $\phi := R_V(WZ \rightarrow B, (t_1[W] \oplus t_2[Z] \| t_2[B]))$;
8.                       if $\phi$ is not trivial then $C := C \cup \{\phi\}$;
9.         for each CFD $\varphi \in \Gamma$ do
10.             if $A$ occurs in $\varphi$ then $\Gamma := \Gamma - \{\varphi\}$;
11.         $\Gamma := \Gamma \cup C$;}
12.     return $\Gamma$.

FIG. 5

*Input*: A set EQ of attribute equivalence classes.
*Output*: A set $\Sigma_d$ of CFDs expressing EQ.

1.     $\Sigma_d := \emptyset$;
2.     for each attribute equivalence class $eq \in EQ$ do
3.         if key(eq) is a constant then
4.             for each attribute $A \in eq$
5.                 $\Sigma_d := \Sigma_d \cup \{R_V(A \rightarrow A, (\_ \| key(eq)))\}$;
6.         if key(eq) = '\_' then
7.             for each $A, B \in eq$ do
8.                 $\Sigma_d := \Sigma_d \cup \{R_V(A \rightarrow B, (x \| x))\}$;
9.     return $\Sigma_d$;

METHODS AND APPARATUS FOR PROPAGATING FUNCTIONAL DEPENDENCIES WITH CONDITIONS

FIELD OF THE INVENTION

The present invention relates to the dependency propagation problem for conditional functional dependencies (CFDs) and, more particularly, to methods and apparatus for computing a propagation cover for conditional functional dependencies.

BACKGROUND OF THE INVENTION

The World Wide Web makes it possible to exchange and integrate data on an unprecedented scale. A natural question in connection with data exchange and integration concerns whether dependencies that hold on data sources still hold on the target data (i.e., data transformed via mapping from the sources). As dependencies (often referred to as integrity constraints) specify a fundamental part of the semantics of the data, one wants to know whether or not the dependencies are propagated from the sources via the mapping, i.e., whether the mapping preserves information.

The dependency propagation problem determines, given a view (mapping) defined on data sources and dependencies that hold on the sources, whether or not another dependency is guaranteed to hold on the view. The dependencies defined on the sources are referred to as source dependencies, and those on the view are referred to as as view dependencies.

The dependency propagation problem has been extensively studied when source and view dependencies are functional dependencies (FDs), for views defined in relational algebra. It has been found that while many source FDs may not hold on the view as they are, they do hold on the view under conditions. In other words, source FDs are indeed propagated to the view, not as standard FDs but as FDs with conditions. The FDs with conditions are in the form of conditional functional dependencies (CFDs). See, U.S. patent application Ser. No. 12/411,935, filed Mar. 26, 2009, entitled "Methods and Apparatus for Identifying Conditional Functional Dependencies," incorporated by reference herein. While the implication and consistency problems for CFDs are addressed, the propagation problem is not considered.

A need therefore exists for methods and apparatus for computing a propagation cover for conditional functional dependencies.

SUMMARY OF THE INVENTION

Generally, methods and apparatus are provided for propagating functional dependencies with conditions. According to one aspect of the invention, propagation covers are computed using an SPC view of a dataset (an SPC view comprises Selection, Projection and Cartesian product operations). The exemplary method comprises the steps of: obtaining a plurality of conditional functional dependencies defined over a schema for the dataset, such as a minimal cover of conditional functional dependencies; processing one or more of the selection operations in the SPC view to extract one or more equivalence classes; processing one or more of the Cartesian product operations in the SPC view to obtain a renamed set of the plurality of conditional functional dependencies, wherein the renamed set comprise conditional functional dependencies having attributes appearing in the SPC view; applying one or more domain constraints from the one or more equivalence classes to the renamed set to remove one or more attributes not in the SPC view; processing one or more of the projection operations in the SPC view using a reduction by resolution procedure to identify one or more inferences that can be propagated to the SPC view from the one or more conditional functional dependencies having attributes that do not appear in the SPC view; converting one or more domain constraints of the equivalence classes to conditional functional dependencies; and determining a cover of the SPC view, such as a minimal cover of the SPC view.

According to additional aspects of the invention, a test is performed to determine if two or more of the conditional functional dependencies are inconsistent. If there are one or more inconsistencies in the equivalence classes, at least one set of conflicting conditional functional dependencies is returned.

A more complete understanding of the present invention, as well as further features and advantages of the present invention, will be obtained by reference to the following detailed description and drawings.

DETAILED DESCRIPTION

The present invention provides methods and apparatus for computing a propagation cover. The disclosed algorithms determine whether a given view dependency is propagated from source dependencies, and find a cover of all view dependencies propagated via SPC views. For a more detailed discussion of the complexity and experimental results of the algorithms described herein, see, W. Fan et al., "Propagating Functional Dependencies with Conditions," Proc. of Very Large Data Bases (VLDB) '08 (August 2008), incorporated by reference herein.

Example 1.1

Consider three data sources $R_1$, $R_2$ and $R_3$, containing information about customers in the United Kingdom (UK), United States (US) and the Netherlands, respectively. It is assumed that these data sources have a uniform schema:

$R_i$ (AC: string, phn: string, name: string, street: string, city: string, zip: string)

Figure 1:
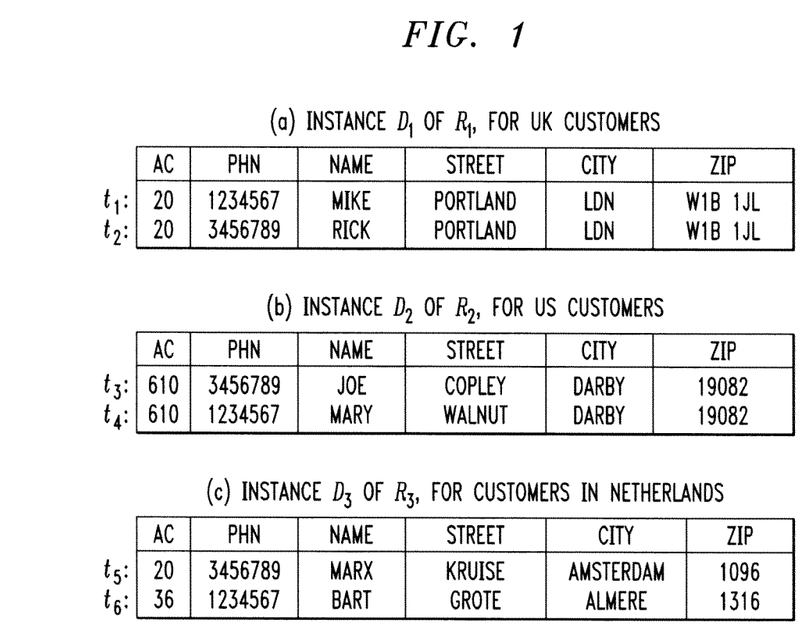
FIG. 1 illustrates three exemplary instances of three data sources containing information about customers in the United Kingdom (UK), United States (US) and the Netherlands, respectively.

Each tuple in an $R_i$ relation specifies a customer's information (area code (AC), phone number (phn), name and address (street, city, zip code)), for $i \in [1,3]$. Example instances $D_1$, $D_2$ and $D_3$ of $R_1$, $R_2$ and $R_3$ are shown in FIG. 1.

Consider the following FDs defined on the UK and Netherland sources: in instances of $R_i$, zipcode uniquely determines street ($f_1$), and area code uniquely determines city ($f_2$); moreover, area code determines city in $R_3$ data ($f_3$)

$f_1$: $R_1$(zip→street), $f_2$: $R_1$(AC→city), $f_3$: $R_3$(AC→city).

Define a view V with query $Q_1 \cup Q_2 \cup Q_3$ to integrate the data from the three sources, where $Q_1$ is select AC, phn, name, street, city, zip, '44' as CC from $R_1$ Define $Q_2$ and $Q_3$ by substituting '01' and '31' for '44', $R_2$ and $R_3$ for $R_1$ in $Q_1$, respectively. The target schema R has all the attributes in the sources and a country-code attribute CC (44, 01, 31 for the UK, US and Netherlands, respectively).

As shown in FIG. 1, $f_1$ on the $R_1$ source does not hold on the target data (view). The view violates $f_1$ due to tuples $t_3$, $t_4$ extracted from $D_2$. Indeed, in the US, zip does not determine street. In other words, $f_1$ is not propagated to the view as an FD. In contrast, the following CFD holds on the view:

$\phi_1$: R([CC='44', zip]→[street]).

That is, for UK customers in the view, zipcode uniquely determines street. In other words, $\phi_1$ is an "FD" with a condition: it is to hold only on the subset of tuples in the view that satisfies the pattern CC='44,' rather than on the entire view. It cannot be expressed as a standard FD.

Similarly, from $f_2$ and $f_3$ one cannot derive a standard FD on the view to assert that "area code uniquely determines city." Indeed, from tuples $t_1$ and $t_5$ in FIG. 1, it can be seen that 20 is an area code in both the UK and the Netherlands, for London and Amsterdam, respectively. However, the following CFDs can be propagated from $f_2$ and $f_3$ via the view:

$\phi_2$: R([CC='44', AC]→[city]),
$\phi_3$: R([CC='31', AC]→[city]).

That is, $f_2$ and $f_3$ hold conditionally on the view: area code determines city for tuples with CC='44' ($\phi_2$) or CC='31' ($\phi_3$). In other words, the semantics specified by the FDs on the sources is preserved by the CFDs on the view.

Furthermore, given the following CFDs on the sources:

$cfd_1$: $R_1$([AC='20']→[city='ldn']),
$cfd_2$: $R_3$([AC='20']→[city='Amsterdam']), then the following CFDs are propagated to the view:

$\phi_4$: R([CC='44,' AC='20']→[city='ldn']),
$\phi_5$: R([CC='31,' AC='20']→[city='Amsterdam']), which carry patterns of semantically related constants.

It is submitted that no previous algorithms developed for FD propagation are capable of deriving these CFDs from the given source FDs via the view. This highlights the need for investigating dependency propagation, for CFDs as view dependencies.

The present invention can be employed in a number of exemplary applications:

(1) Data Exchange. Recall Example 1.1. Suppose that the target schema R and CFDs $\phi_2$ and $\phi_3$ are predefined. Then, the propagation analysis assures that the view definition V is a schema mapping from ($R_1$, $R_2$, $R_3$) to R, i.e., for any source instances $D_1$ and $D_3$ of $R_1$ and $R_3$ that satisfy the FDs $f_2$ and $f_3$, respectively, and for any source instance $D_2$ of $R_2$, the view $V(D_1, D_2, D_3)$ is an instance of the target schema R and is guaranteed to satisfy $\phi_2$ and $\phi_3$.

(2) Data Integration. Suppose that V is a mapping in an integration system, which defines a global view of the sources. Then, certain view updates, e.g., insertion of a tuple t with CC='44,' AC='20' and city='edi,' can be rejected without checking the data, since it violates the CFD $\phi_4$ propagated from the sources.

(3) Data Cleaning. In contrast to FDs that were developed for schema design, CFDs have been proposed for data cleaning. Suppose that CFDs $\phi_1$-$\phi_5$ are defined on the target database, for checking the consistency of the data. Then, propagation analysis assures that one need not validate these CFDs against the view V. In contrast, if in addition, an FD $\phi_6$: R(CC, AC, phn→street, city, zip) is also defined on the target, then $\phi_6$ has to be validated against the view since it is not propagated from the source dependencies.

Views are generally expressed in various fragments of relational algebra (RA), and source dependencies are generally expressed either as traditional FDs or CFDs. It has been found that in many cases CFD propagation retains the same complexity as its FD counterpart, but in some cases CFDs do incur extra complexity. The dependency propagation problem is considered in the presence of finite-domain attributes.

According to one aspect of the present invention, algorithms are provided for computing a propagation cover. In many applications, one wants not only to know whether a given view dependency is propagated from source dependencies, but also to find a cover of all view dependencies propagated. From the cover, all view dependencies can be deduced via implication analysis. This is needed for, e.g., processing view updates and detecting inconsistencies, as shown by the data integration and data cleaning examples given above.

Even for certain FDs and views defined with a single projection operator, a minimal cover of all view FDs propagated is sometimes necessarily exponentially large, in the infinite-domain setting. A typical method to find a cover is by first computing the closure of all source FDs, and then projecting the closure onto the view schema. While this method always takes exponential time, it is the algorithm recommended by database textbooks.

Already hard for FDs and projection views, the propagation cover problem is intriguing for CFDs and SPC views. The present invention provides an algorithm to compute a minimal cover of CFDs propagated via SPC views in the absence of finite-domain attributes, by extending a practical algorithm proposed in S. Gottlob, "Computing Covers for Embedded Functional Dependencies," Proc. of Principles of Database Systems (PODS) (1987), incorporated by reference herein and hereinafter referred to as Gottlob 1987, for computing a cover of FDs propagated via projection views. Despite the increased expressive power of CFDs and SPC views, the disclosed algorithm has approximately the same complexity as the algorithm of Gottlob 1987. The disclosed algorithm behaves polynomially in many practical cases. Indeed, exponentially large covers are mostly found in examples intentionally constructed. Further, from this algorithm, an effective polynomial-time heuristic is immediate: it computes a minimal cover when the cover is not large, and returns a subset of a cover as soon as the computation reaches a predefined bound, when covers are inherently large.

The present invention thus computes minimal propagation covers via SPC views, for FDs or CFDs.

Dependencies and Views

Conditional Functional Dependencies

CFDs extend FDs by incorporating a pattern tuple of semantically related data values. For each attribute A in a schema R, its associated domain is denoted as dom(A), which is either infinite (e.g., string, real) or finite (e.g., Boolean, date).

Definition 2.1: A CFD $\phi$ on a relation schema R is a pair R (X→Y, $t_p$), where (1) X→Y is a standard FD, called the FD embedded in $\phi$; and (2) $t_p$ is a tuple with attributes in X and Y, referred to as the pattern tuple of $\phi$, where for each A in X (or Y), $t_p$[A] is either a constant 'a' in dom(A), or an unnamed variable '_' that draws values from dom(A). The X and Y attributes in $t_p$ are separated with '‖'.

For CFDs on views (i.e., view CFDs) a special form $R(A \rightarrow B, (x\|x))$ is allowed, where A, B are attributes of R and x is a (special) variable.

Note that traditional FDs are a special case of CFDs, in which the pattern tuples consist of '_' only.

Example 2.1

The dependencies discussed above can be expressed as CFDs, such as:

$\phi_1$: R([CC, zip]→[street], (44, _∥_)),
$\phi_2$: R([CC, AC]→[city], (44, _∥_)),
$\phi_4$: R([CC, AC]→[city], (44, 20∥ldn)),
$f_1$: $R_1$(zip→street, (_∥_)).

The standard FD $f_1$ on source $R_1$ is expressed as a CFD.

The semantics of CFDs is defined in terms of a relation $\asymp$ on constants and '_': $\eta_1 \asymp \eta_2$ if either $\eta_1 = \eta_2$, or one of $\eta_1, \eta_2$ is '_'. The operator $\asymp$ naturally extends to tuples, e.g., (Portland, LDN) $\asymp$ (_, LDN) but (Portland, LDN) $\not\asymp$ (_, NYC). A tuple $t_1$ matches $t_2$ if $t_1 \asymp t_2$.

An instance D of R satisfies $\phi = R(X \rightarrow Y, t_p)$, denoted by $D \models \phi$, if for each pair of tuples $t_1, t_2$ in D, if $t_1[X] = t_2[X] \asymp t_p[X]$, then $t_1[Y] \asymp t_p[Y]$.

Intuitively, $\phi$ is a constraint defined on the set $D_\phi = \{t | t \in D, t[X] \asymp t_p[X]\}$ such that for any $t_1, t_2 \in D_\phi$, if $t_1[X] = t_2[X]$, then (a) $t_1[Y] = t_2[Y]$, and (b) $t_1[Y] \asymp t_p[Y]$. Here, (a) enforces the semantics of the embedded FD, and (b) assures the binding between constants in $t_p[Y]$ and constants in $t_1[Y]$. Note that $\phi$ is defined on the subset $D_\phi$ of D identified by $t_p[X]$, rather than on the entire D.

An instance D of R satisfies CFD $R(A \rightarrow B, (x\|x))$ if for any tuple t in D, $t[A] = t[B]$. As discussed further below, these CFDs are used to express selection conditions of the form $A = B$ in a view definition, treating domain constraints and CFDs in a uniform framework.

An instance D of a relational schema R satisfies a set $\Sigma$ of CFDs defined on R, denoted by $D \models \Sigma$, if $D \models \phi$ for each $\phi$ in $\Sigma$.

Example 2.2

Recall the view definition V from Example 1.1, and the instances $D_1, D_2, D_3$ of FIG. 1. The view $V(D_1, D_2, D_3)$ satisfies $\phi_1$, $\phi_2$, $\phi_4$ of Example 2.1. However, if attribute CC are removed from $\phi_4$, then the view no longer satisfies the modified CFD. Indeed, there are two tuples $t_1'$ and $t_5'$ in $V(D_1, D_2, D_3)$ such that $t_1'$ and $t_1$ of FIG. 1 have identical AC and city values; similarly for $t_5$ and $t_5'$ of FIG. 1. Then, $t_1'$ and $t_5'$ violate the modified CFD: they have the same AC attribute but differ in city.

View Definitions

The present invention addresses dependency propagation for views expressed in various fragments of RA. The problem is already undecidable for FDs and views defined in RA. Consider a relational schema $R = (S_1, \ldots, S_m)$.

SPC. An SPC query (also referred to as a conjunctive query) Q on R is an RA expression defined in terms of the selection ($\sigma$), projection ($\pi$), Cartesian product ($\times$) and renaming ($\rho$) operators. It can be expressed in the following normal form:

$$\pi_Y(R_c \times E_s), \text{ where } E_s = \sigma_F(E_c), E_c = R_1 \times \ldots \times R_n,$$

where (a) $R_c = \{(A_1:a_1, \ldots, A_m:a_m)\}$, a constant relation, such that for each $i \in [1, m]$, $A_i$ is in Y, $A_i$'s are distinct, and $a_i$ is a constant in dom($A_i$); (b) for each $j \in [1, n]$, $R_j$ is $\rho_j(S)$ for some relation atom in R, and $\rho_j$ is a renaming operator such that the attributes in $R_j$ and $R_l$ are disjoint if $j \neq l$, and $A_i$ does not appear in any $R_j$; (c) F is a conjunction of equality atoms of the form $A = B$ and $A = 'a'$ for a constant $a \in \text{dom}(A)$.

Fragments of SPC are also considered, denoted by listing the operators supported: S, P, C, SP, SC, and PC (the renaming operator is included in all these subclasses by default without listing it explicitly). For instance, SC is the class of queries defined with $\sigma$, $\times$ and $\rho$ operators.

Figure 2:
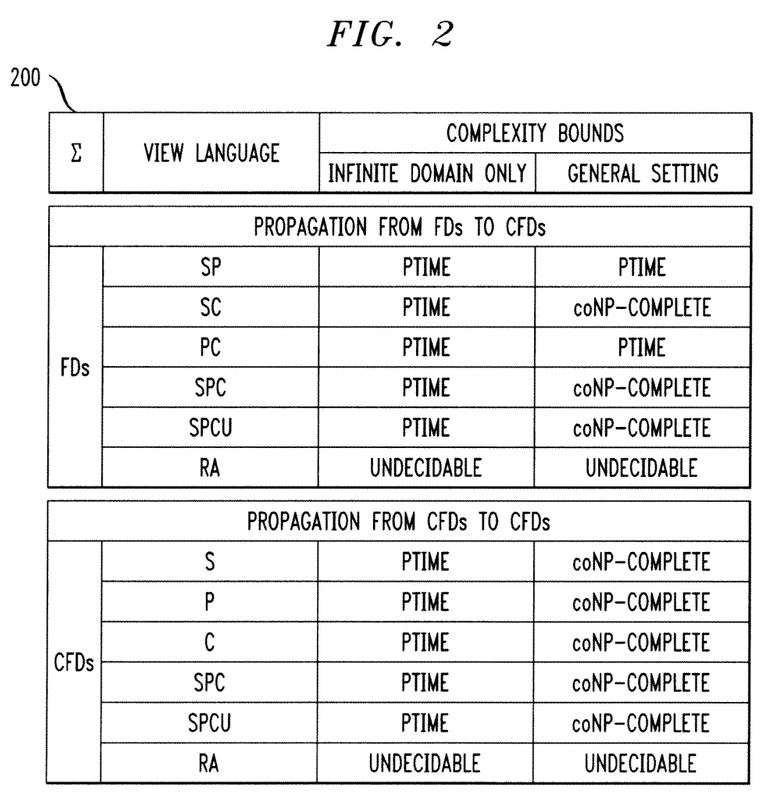
FIG. 2 is a sample table illustrating the complexity of CFD propagation for various view languages.

FIG. 2 is a sample table 200 illustrating the complexity of CFD propagation for various view languages.

For example, $Q_1$ given in Example 1.1 can be expressed as a C query: (CC: 44) $\times R_1$.

SPCU. SPCU (also referred to as a union of conjunctive queries) is an extension of SPC by allowing union ($\cup$). An SPCU query defined on R can be expressed in normal form $V_1 \cup \ldots \cup V_n$, where $V_i$'s are union-compatible SPC queries. For example, the view V given in Example 1.1 is an SPCU query.

Computing Covers of View Dependencies

As indicated above, the present invention provides methods and apparatus for computing a propagation cover. The disclosed algorithms determine whether a given view dependency is propagated from source dependencies, and find a cover of all view dependencies propagated. In other words, aspects of the present invention find a minimal cover of all view CFDs propagated from source CFDs.

The disclosed exemplary algorithm for finding a propagation cover also readily provides a solution for determining whether a given CFD $\phi$ is propagated from a given set $\Sigma$ of source CFDs via an SPC view V: one can compute a minimal cover $\Gamma$ of all CFDs propagated from $\Sigma$ via V, and then check whether $\Gamma$ implies $\phi$.

The disclosed exemplary algorithm for finding a propagation cover is an extension of a practical algorithm proposed in Gottlob 1987, for computing covers of FDs propagated via projection views. The disclosed exemplary algorithm has the same complexity as that of Gottlob 1987, and behaves polynomially in many practical cases. The disclosed exemplary algorithm also yields an algorithm for computing propagation covers when FDs are source dependencies, a special case.

The absence of finite-domain attributes is assumed, the same setting as the classical work on FD propagation. In this setting, the emptiness problem for CFDs and SPC views, and the CFD propagation problem via SPC views are all in ptime. Without loss of generality, CFDs are considered in the normal form: $(R: X \rightarrow A, t_p)$, where A is a single attribute. Indeed, each CFD of the general form given int the section entitled "Dependences and Views," can be converted in linear time to an equivalent set of CFDs in the normal form.

Propagation Cover Problem

Implication and Cover. A set $\Sigma$ of CFDs defined on a schema R implies another CFD $\phi$ on R, denoted by $\Sigma \models \phi$, if for any instance D of R, if $D \models \Sigma$ then $D \models \phi$.

A cover of a set $\Sigma$ of CFDs is a subset $\Sigma_c$ of $\Sigma$ such that for each CFD $\phi$ in $\Sigma$, $\Sigma_c \models \phi$. In other words, $\Sigma_c$ is contained in, and is equivalent to, $\Sigma$. For example, recall the notion of the closure $F^+$ of a set F of FDs, which is needed for designing normal forms of relational schema. Then, F is a cover of $F^+$.

A minimal cover $\Sigma_{mc}$ of $\Sigma$ is a cover of $\Sigma$ such that
no proper subset of $\Sigma_{mc}$ is a cover of $\Sigma$, and
for each CFD $\phi = R(X \rightarrow A, t_p)$ in $\Sigma_{mc}$, there exists no proper subset $Z \subset X$ such that $(\Sigma_{mc} \cup \{\phi'\}) - \{\phi\} \models \phi$, where $\phi' = R(Z \rightarrow A, (t_p[Z] \| t_p[A]))$.

That is, there is neither redundant attributes in each CFD nor redundant CFDs in $\Sigma_{mc}$.

Only nontrivial CFDs are included in $\Sigma_{mc}$. A CFD $R(X \to A, t_p)$ is nontrivial if either (a) $A \notin X$, or (b) $X=AZ$ but $t_p$ is not of the form $(\eta_1, \overline{d_Z} \| \eta_2)$, where either $\eta_1 = \eta_2$, or $\eta_1$ is a constant and $\eta_2 = \text{'}\_\text{'}$.

It is known that without finite-domain attributes, implication of CFDs can be decided in quadratic time. Further, there is an algorithm referred to as MinCover that computes $\Sigma_{mc}$ in $O(|\Sigma|^3)$ time for any given set $\Sigma$ of CFDs. See, U.S. patent application Ser. No. 12/411,935, filed Mar. 26, 2009, entitled "Methods and Apparatus for Identifying Conditional Functional Dependencies," incorporated by reference herein.

Propagation Cover. For a view V defined on a schema R and a set $\Sigma$ of source CFDs on R, $\text{CFD}_p(\Sigma, V)$ denotes the set of all view CFDs propagated from $\Sigma$ via V.

The propagation cover problem is to compute, given V and $\Sigma$, a cover $\Gamma$ of $\text{CFD}_p(\Sigma, V)$. $\Gamma$ is referred to as a propagation cover of $\Sigma$ via V, and as a minimal propagation cover if $\Gamma$ is a minimal cover of $\text{CFD}_p(\Sigma, V)$.

Challenges. The following example shows that the problem is already hard for FDs and P views.

Example 3.1

Consider a schema R with attributes $A_i$, $B_i$, $C_i$ and D, and a set $\Sigma$ of FDs on R consisting of $A_i \to C_i$, $B_i \to C_i$, and $C_1, \ldots, C_n \to D$, for each $i \in [1,n]$. Consider a view that projects an R relation onto their $A_i, B_i$ and D attributes, dropping $C_i$'s. Then, any cover $\Sigma_c$ of the set of view FDs propagated necessarily contains all FDs of the form $\eta_1, \ldots, \eta_n \to D$, where $\eta_i$ is either $A_i$ or $B_i$ for $i \in [1,n]$. $\Sigma_c$ contains at least $2^n$ FDs, whereas the size of the input, namely, $\Sigma$ and the view, is $O(n)$. Indeed, to derive view FDs from $C_1, \ldots, C_n \to D$, one can substitute either $A_i$ or $B_i$ for each $C_i$, leading to an exponential blowup.

In contrast, the dependency propagation problem is in ptime in this setting (See, e.g., FIG. 2). This shows the sharp distinction between the dependency propagation problem and the propagation cover problem.

The computation of embedded FDs computes a propagation cover of FDs via projection views. Given a schema R, a set F of FDs on R and a set Y of attributes in R, it is to find a cover $F_c$ of all FDs propagated from F via a projection view $\pi_Y(R)$. An algorithm for finding $F_c$ is by first computing the closure $F^+$ of F, and then projecting $F^+$ onto Y, removing those FDs with attributes not in Y. This algorithm takes $O(2^{|F|})$ time, for computing $F^+$.

The propagation cover problem is more intricate for CFDs and SPC views.

(a) While at most exponentially many FDs can be defined on a schema R, there are possibly infinitely many CFDs. Indeed, there are infinitely many CFDs of the form $R(A \to B, t_p)$ when $t_p[A]$ ranges over values from an infinite dom(A).

(b) While $AX \to A$ is a trivial FD and can be ignored, $\phi = R(AX \to A, t_p)$ may not be ignored. Indeed, when $t_p$ is $(\_, \overline{d_X} \| a)$. $\phi$ is meaningful: it asserts that for all tuples t such that $t[X] \asymp \overline{d_X}$, the A column has the same constant 'a'.

(c) While $X \to Y$ and $Y \to Z$ yield $X \to Z$ for FDs, the transitivity rule for CFDs has to take pattern tuples into account and is more involved than its FD counterpart.

(d) Selection and Cartesian product introduce interaction between domain constraints and CFDs, a complication of SPC views not encountered when dealing with projection views.

Propagating CFDs Via SPC Views

The exponential complexity of Example 3.1 is for the worst case and is only found in examples intentionally constructed. In practice, it is common to find a propagation cover of polynomial size, and thus it may be an overkill to use algorithms that always take exponential time. Thus, an algorithm is needed for computing minimal propagation covers that behaves polynomially most of the time, whereas it necessarily takes exponential time only when all propagation covers are exponentially large for a given input. The present invention provides an algorithm, referred to as PropCFD SPC, that extends the algorithm of Gottlob 1987 for computing a propagation cover of FDs via projection views. Given an SPC view V defined on a schema R, and a set $\Sigma$ of source CFDs on R, the disclosed PropCFD SPC computes a minimal propagation cover $\Gamma$ of $\Sigma$ via V, without increasing the complexity of the extended algorithm, although CFDs and SPC views are more involved than FDs and P views, respectively.

Before PropCFD SPC is presented, some basic results are provided. Let $R = (S_1, \ldots, S_m)$ be the source schema. Recall from the section entitled "Dependencies and Views" that V defined on R is of the form:

$$\pi_Y(R_c \times E_s), E_s = \sigma_F(E_c), E_c = R_1 \times \ldots \times R_n$$

where $R_c$ is a constant relation, $R_j$'s are renamed relation atoms $\rho_j(S)$ for S in R, Y is the set of projection attributes, and F is a conjunction of equality atoms.

Basic Results. The constant relation $R_c$ introduces no difficulties: for each $(A_i : a_i)$ in $R_c$, a CFD $R_V(A_i \to A_i, (\_\|a))$ is included in $\Gamma$, where $R_V$ is the view schema derived from V and R. Thus, it is assumed that $V = \pi_Y(E_s)$.

The reduction below allows a focus on $E_s$ instead of V.
Proposition 3.1: For any SPC view V of the form above, and any set $\Sigma$ of source CFDs, $\Sigma \models_V \phi$ iff $\Sigma \models_{E_s} \phi$ when
  $\phi = R_V(A \to B, (x\|x))$, denoting $A = B$;
  $\phi = R_V(A \to A, (\_\|a))$, denoting $A = \text{'}a\text{'}$; or
  $\phi = R_V(X \to A, t_p)$;
where $A \in Y$, $B \in Y$, and $X \subseteq Y$.

Consider the interaction between CFDs and operators $\times, \sigma$ and $\pi$ in the view definition V.

Cartesian Product. Observe that each $R_j$ in $E_c$ is $\rho_j(S)$, where S is in R. All source CFDs on S are propagated to the view, after their attributes are renamed via $\rho_j$.

Selection. The condition F in $\sigma_F$ brings domain constraints into play, which can be expressed as CFDs.

Lemma 3.2: (a) If $A = \text{'}a\text{'}$ is in the selection condition F, then $R_V(A \to A, (\_\|a))$ is in $\text{CFD}_p(\Sigma, V)$. (b) If $A = B$ is in F, then $R_V(A \to B, (x\|x))$ is in $\text{CFD}_p(\Sigma, V)$ for the special variable x.

That is, one can incorporate domain constraints $A = \text{'}a\text{'}$ and $A = B$ enforced by the view V into CFDs. Here (a) asserts that the A column of the view contains the same constant 'a', and (b) asserts that for each tuple t in the view, $t[A]$ and $t[B]$ are identical, as required by the selection condition F in the view V (this is why CFDs of the form $R_V(A \to B, (x\|x))$ were introduced in the section entitled "Dependencies and Views").

Lemma 3.3: If $R_V(A \to B, (x\|x))$ and $R_V(BX \to G, t_p)$, then $R_V(AX \to G, t_p)$ is in $\text{CFD}_p(\Sigma, V)$, where $t_p[A] = t_p[B]$, $t_p[X] = t_p[X]$ and $t_p[G] = t_p[G]$.

That is, view CFDs can be derived by applying the domain constraint $A = B$: substituting A for B in a view CFD yields another view CFD. This also demonstrates how domain constraints interact with CFD propagation.

$\Sigma_d$ denotes these CFDs as well as those in $\Sigma$ expressing domain constraints. Based on $\Sigma_d$, it can be decided whether $A = B$ or $A = \text{'}a\text{'}$ for attributes in Y (i.e., $R_V$).

More specifically, the attributes are partitioned into a set EQ of equivalence classes, such that for any $eq \in EQ$, and for any attributes A, B in Y, (a) A, $B \in eq$ iff $A = B$ can be derived from $\Sigma_d$; (b) if $A = \text{'}a\text{'}$ can be derived from $\Sigma_d$ and moreover, $A \in eq$, then for any $B \in eq$, $B = \text{'}a\text{'}$; the constant 'a' as is key of eq, denoted by key(eq). If a constant is not available, key(eq) is '$\_$'.

The use of EQ helps decide whether or not V and $\Sigma$ always yield empty views, which happens if there exists some eq∈EQ such that key(eq) is not well-defined, i.e., when two distinct constants are associated with eq.

A procedure is provided to compute EQ, referred to as ComputeEQ, which takes $\Sigma$ and V as input, and returns EQ as output, along with key(eq) for each eq∈EQ. If key(eq) is not well-defined for some eq, it returns a special symbol '⊥', indicating the inconsistency in V and $\Sigma$.

Projection. To remedy the limitations of closure-based methods for computing propagation covers of FDs via P views, Gottlob 1987 proposed a practical algorithm based on the idea of Reduction by Resolution (RBR). RBR and the algorithm of Gottlob 1987 are extended herein to handle CFDs and projection.

To illustrate RBR, a partial order $\leq$ is we first defined on constants and '_': $\eta_1 \leq \eta_2$ if either $\eta_1$ and $\eta_2$ are the same constant 'a', $\eta_2$='_'.

Given CFDs $\phi_1 = R(X \to A, t_p)$ and $\phi_2 = R(AZ \to B, t_{p'})$, if $t_p[A] \leq t_{p'}[A]$ and for each $C \in X \cap Z$, $t_p[C] \asymp t_{p'}[C]$, then $\phi = R(XZ \to B, s_p)$ can be derived based on CFD implication (See, U.S. patent application Ser. No. 12/411,935, referenced above). Here, $s_p = (t_p[X] \oplus t_{p'}[Z] \| t_{p'}[B])$, and $t_p[X] \oplus t_{p'}[Z]$ are defined as follows:

for each $C \in X-Z$, $s_p[C] = t_p[C]$;
for each $C \in Z-X$, $s_p[C] = t_{p'}[C]$;
for each $C \in X \cap Z$, $s_p[C] = \min(t_p[C], t_{p'}[C])$, i.e., the smaller one of $t_p[C]$ and $t_{p'}[C]$ if either $t_p[C] \leq t_{p'}[C]$ or $t_{p'}[C] \leq t_p[C]$; it is undefined otherwise.

Following Gottlob 1987, $\phi$ is referred to as an A-resolvent of $\phi_1$ and $\phi_2$.

Example 3.2

Consider CFDs $\phi_1 = R([A_1, A_2] \to A, t_1)$ and $\phi_2 = R([A, A_2, B_1] \to B, t_2)$, where $t_1 = (\_, c \| a)$ and $t_2 = (\_, c, b \|\_)$. Then, $\phi = R([A_1, A_2, B_1] \to B, t_p)$ is an A-resolvent of $\phi_1$ and $\phi_2$, where $t_p = (\_, c, b \|\_)$.

Following Gottlob 1987, the following are defined. Given $\pi_Y(R)$ and a set $\Sigma$ of CFDs on R, let U be the set of attributes in R.

For $A \in (U-Y)$, let Res($\Sigma$, A) denote the set of all nontrivial A-resolvents. Intuitively, it shortcuts all CFDs involving A.

Denote by Drop($\Sigma$, A) the set Res($\Sigma$, A)∪$\Sigma[U-\{A\}]$, where $\Sigma[Z]$ denotes the subset of $\Sigma$ by including only CFDs with attributes in Z.

Define RBR($\Sigma$, A)=Drop($\Sigma$, A) and inductively, RBR($\Sigma$, A)=Drop(Drop($\Sigma$, A), Z).

Then, the following result is provided, in which $F^+$ denotes the closure of F, i.e., the set of all CFDs implied by F.

Proposition 3.4: For a view $\pi_Y(R)$ and a set $\Sigma$ of CFDs on R, (a) for each $A \in (U-Y)$, Drop($\Sigma$, A)$^+$=$\Sigma^+[U-\{A\}]$; (b) RBR($\Sigma$, U-Y) is a propagation cover of $\Sigma$ via $\pi_Y(R)$, where U is the set of attributes in R.

A procedure is provided for computing a propagation cover of $\Sigma$ via $\pi_Y(R)$, also denoted by RBR. Generally, the idea is to repeatedly "drop" attributes in U-Y, shortcutting all CFDs that involve attributes in U-Y. The procedure takes as input $\Sigma$ and $\pi_Y(R)$, and returns RBR($\Sigma$, U-Y) as the output.

Lemma 3.5: If for any source instance D where $D \models \Sigma$, V(D) is empty, then $R_V(A \to A, (\_ \| a))$ and $R_V(A \to A, (\_ \| b))$ are in $CFD_p(\Sigma, V)$, for any attribute A in $R_V$ and any distinct values a, b∈dom(A).

Generally, this ensures that the view is always empty (based on the emptiness problem): no tuple t in the view can possibly satisfy the CFDs, which require t[A] to take distinct a and b as its value. As a result, any CFD on the view can be derived from these "inconsistent" CFDs.

Algorithm for Computing Minimal Covers

Figure 3:
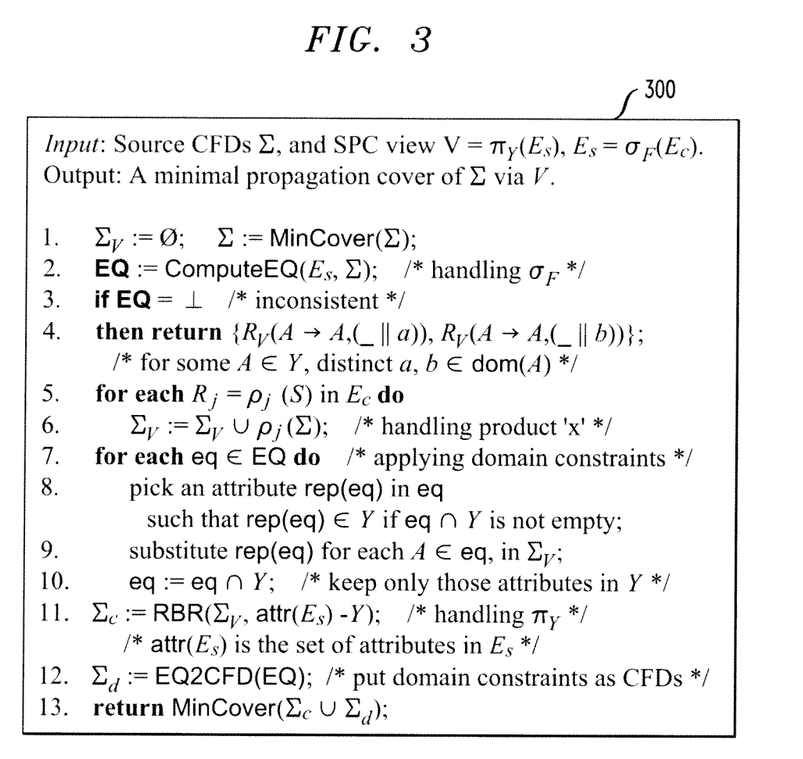
FIG. 3 provides exemplary pseudo code for an exemplary embodiment of the algorithm incorporating features of the present invention.

FIG. 3 provides exemplary pseudo code for an exemplary embodiment of the algorithm PropCFD_SPC 300. As shown in FIG. 3, the algorithm 300 first processes selection $\sigma_F$ (line 2), extracting equivalence classes EQ via procedure ComputeEQ, described above (not shown). If an inconsistency is discovered, algorithm 300 returns a pair of "conflicting" view CFDs that ensure the view is empty (lines 3-4). Algorithm 300 then processes the Cartesian product, and gets a set $\Sigma_V$ of CFDs via renaming as described above (lines 5-6). Algorithm 300 applies the domain constraints of EQ to $\Sigma_V$ (line 9), by designating an attribute rep(eq) for each equivalence class eq in EQ (line 8), which is used uniformly wherever attributes in eq appear in CFDs of $\Sigma_V$. Algorithm 300 also removes attributes in eq that are not in the projection list Y (line 10), since these attributes do not contribute to view CFDs. Next, algorithm 300 handles the projection $\pi_Y$, by invoking procedure RBR (line 11), discussed below in conjunction with FIG. 4, and then converts domain constraints of EQ to CFDs via procedure EQ2CFD (line 12), discussed below in conjunction with FIG. 5. Finally, algorithm 300 returns a minimal cover of the results returned by these procedures, by invoking procedure MinCover, referenced above. This yields a minimal propagation cover of V via $\Sigma$ (line 13).

Figure 4:
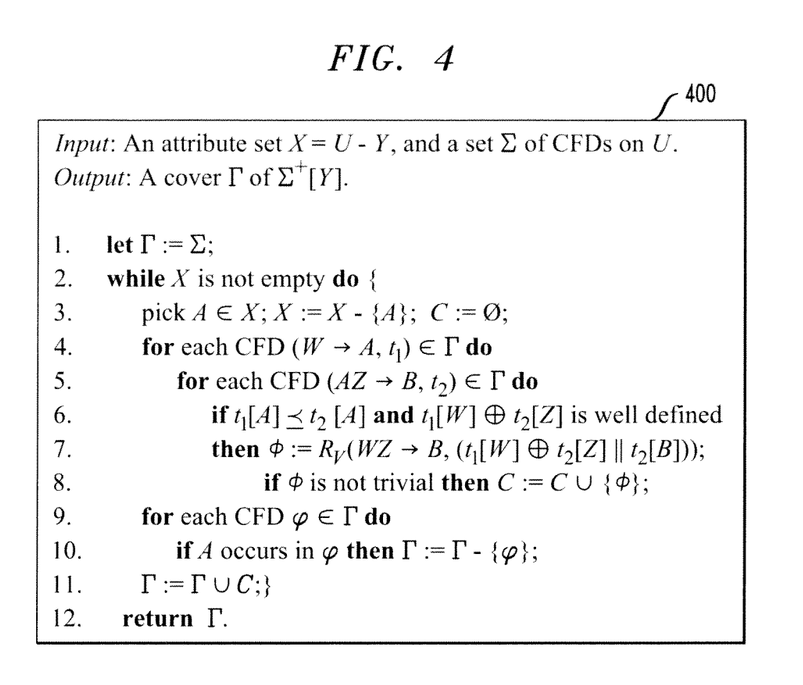
FIG. 4 provides exemplary pseudo code for an exemplary embodiment of a reduction by resolution (RBR) procedure.

FIG. 4 provides exemplary pseudo code for an exemplary embodiment of the RBR procedure 400. Generally, the RBR procedure 400 implements the RBR method: for each $A \in U-Y$, the RBR procedure 400 computes an A-resolvent (lines 4-8) and Drop($\Sigma$, A) (lines 4-11). Only nontrivial CFDs are included (line 8). By dropping all attributes in U-Y, it obtains RBR($\Sigma$, U-Y), a cover of $\Sigma$ and $\pi_Y$ by Proposition 3.4.

Figure 5:
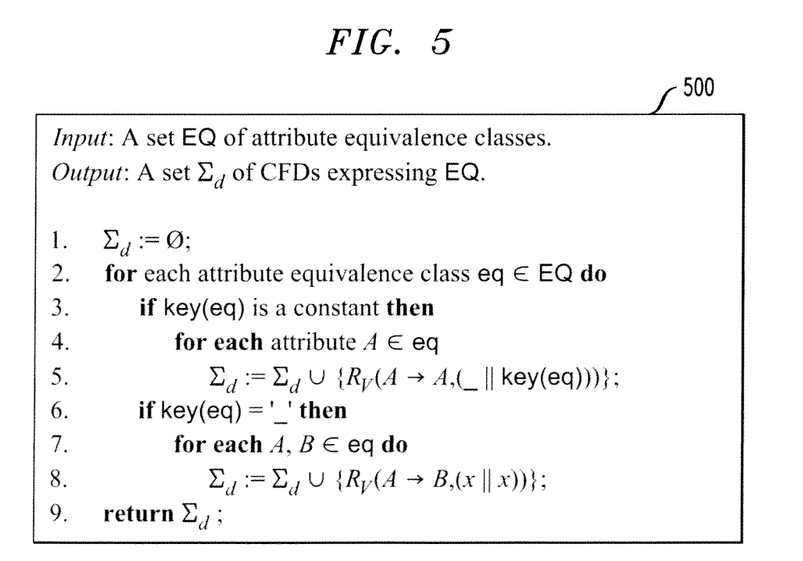
FIG. 5 provides exemplary pseudo code for an exemplary embodiment of an EQ2CFD procedure incorporating features of the present invention.

FIG. 5 provides exemplary pseudo code for an exemplary embodiment of the EQ2CFD procedure 500. Generally, the EQ2CFD procedure 500 converts domain constraints enforced by EQ to equivalent CFDs (lines 2-8), by Lemma 3.2. For each eq in EQ, the EQ2CFD procedure 500 leverages the constant key(eq) whenever it is available (lines 4-5). When it is not available, the EQ2CFD procedure 500 uses the special variable x in the CFDs (lines 6-8).

Example 3.3

Consider sources $R_1(B_{1'}, B_2)$, $R_2(A_1, A_2, A)$, $R_3(A', A_2, B_1, B)$, and view $V = \pi_Y(\sigma_F(R_1 \times R_2 \times R_3))$, where $Y = \{B_1, B_2, B_{1'}, A_1, A_2, B\}$, and F is ($B_1 = B_{1'}$ and $A = A'$ and $A_2 = A_{2'}$). Consider $\Sigma$ consisting of $\psi_1 = R_2([A_1, A_2] \to A, t_1)$ and $\psi_2 = R_3([A', A_2, B_1] \to B, t_2)$, for $t_1, t_2$ given in Example 3.2.

Applying algorithm PropCFD_SPC 300 to $\Sigma$ and V, after step 10, EQ consists of $\{\{B_1, B_{1'}\}, \{B_2\}, \{A_1\}, \{A_2\}, \{B\}\}$, and $\Sigma_V$ consists of $\phi_1, \phi_2$ of Example 3.2. As also given there, procedure RBR returns $\phi$ of Example 3.2. The EQ2CFD procedure 500 returns $\phi' = R(B_1 \to B_{1'}, (x \| x))$, where R is the view schema with attributes in Y. Then, the cover returned by the algorithm consists of $\phi$ and $\phi'$.

Analysis. It can be shown that for each $\phi$ in $CFD_p(\Sigma, V)$, $\Gamma \models \phi$, and vice versa, where $\Gamma$ is the output of the algorithm.

For the complexity, let $V = \pi_Y(\sigma_F(E_c))$. Then $|Y| \leq |E_c|$ and $|F| \leq (|E_c|^2 + |E_c|)$. (a) Procedure ComputeEQ 500 takes $O(|E_c|^4 * |\Sigma|)$ time. (b) EQ2CFD 300 is in $O(|Y|^3)$ time. (c) Procedure RBR 400 has the same complexity as its counterpart in Gottlob 1987: $O(|E_c|^2 * a^3)$, where a is an upper bound for the cardinality of $\Gamma$ during the execution of RBR 400. (d) The rest of the computation takes at most $O(|\Sigma|^3 + a^3 + |E_c|^2)$ time. Since a is no less than $|E_c| * |\Sigma|$, RBR 400 takes at least $O(|E_c|^5 * |\Sigma|^3)$ time. Putting these together, the cost of RBR 400 dominates. That is, the complexity of PropCFD_SPC 300 is the same as the bound on the algorithm of Gottlob 1987. Note that both $\Sigma$ and V are defined at the schema level (it has nothing to do with the instances of source databases), and are often small in practice.

In one exemplary embodiment, minimal cover is used as an optimization technique. First, $\Sigma$ is "simplified" by invoking MinCover($\Sigma$) (line 1 of FIG. 3), removing redundant source CFDs. Second (not shown), in procedure RBR 400, to reduce the size of intermediate $\Gamma$ during the computation, one can change line 11 of FIG. 4 to "$\Gamma := \text{MinCover}(\Gamma \cup C)$". In the exemplary implementation, $\Gamma$ is partitioned into $\Gamma_1, \ldots \Gamma_k$, each of a fixed size $k_0$, and MinCover($\Gamma_i$) is invoked. This removes redundant CFDs from $\Gamma$, to an extent, without increasing the worst-case complexity since it takes $O(|\Gamma|*k_0^2)$ time to conduct.

As another optimization technique, one may optionally simplify or minimize input SPC views. This works to an extent: the minimization problem for SPC queries is intractable.

System and Article of Manufacture Details

Figure 6:
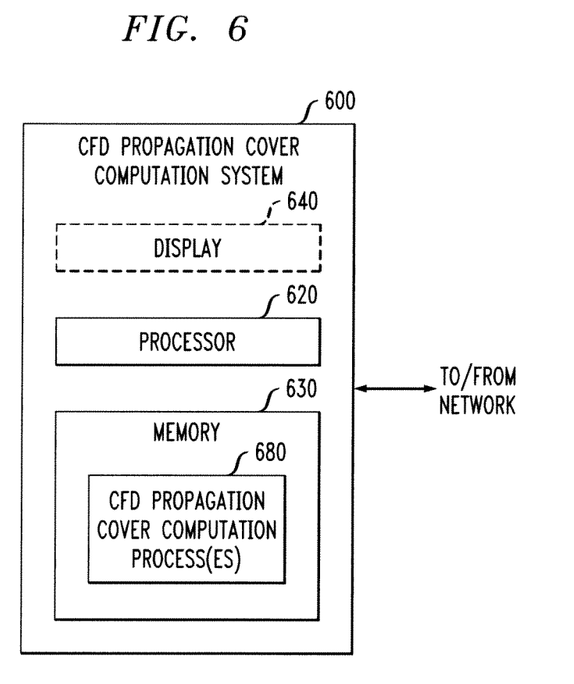
FIG. 6 is a block diagram of a CFD Propagation Cover Computation System that can implement the processes of the present invention.

FIG. 6 is a block diagram of a CFD Propagation Cover Computation System 600 that can implement the processes of the present invention. As shown in FIG. 6, memory 630 configures the processor 620 to implement the methods, steps, and functions disclosed herein (collectively, shown as CFD propagation cover computation processes 680 in FIG. 6). The memory 630 could be distributed or local and the processor 620 could be distributed or singular. The memory 630 could be implemented as an electrical, magnetic or optical memory, or any combination of these or other types of storage devices. It should be noted that each distributed processor that makes up processor 620 generally contains its own addressable memory space. It should also be noted that some or all of computer system 600 can be incorporated into a personal computer, laptop computer, handheld computing device, application-specific circuit or general-use integrated circuit.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for computing propagation covers of conditional functional dependencies using an SPC view of a dataset, wherein said SPC view comprises one or more of selection, projection and Cartesian product (SPC) operations, said method comprising:
obtaining a plurality of said conditional functional dependencies defined over a schema for said dataset, wherein said conditional functional dependencies comprise one or more constraints that data in said SPC view must satisfy;
processing one or more of said selection operations in said SPC view to extract one or more equivalence classes;
processing one or more of said Cartesian product operations in said SPC view to obtain a renamed set of said plurality of conditional functional dependencies, wherein said renamed set comprise conditional functional dependencies having attributes appearing in said SPC view;
applying one or more domain constraints from said one or more equivalence classes to said renamed set to remove one or more attributes not in said SPC view;
processing one or more of said projection operations in said SPC view using a reduction by resolution procedure to identify one or more inferences that is propagated to said SPC view from said one or more conditional functional dependencies having attributes that do not appear in said SPC view;
converting one or more domain constraints of said equivalence classes to conditional functional dependencies; and
determining a cover of said SPC view, wherein said cover comprises a set of conditional functional dependencies propagated from a set of said obtained conditional functional dependencies using said SPC view.

2. The method of claim 1, wherein said cover of said SPC view is a minimal cover of said SPC view.

3. The method of claim 1, further comprising the step of determining if two or more of said conditional functional dependencies are inconsistent.

4. The method of claim 1, wherein said obtained plurality of conditional functional dependencies are a minimal cover of conditional functional dependencies.

5. The method of claim 1, wherein said step of processing one or more selection operations in said SPC view further comprises the steps of handling one or more inconsistencies in said equivalence classes and returning at least one set of conflicting conditional functional dependencies if said equivalence classes are inconsistent.

6. The method of claim 1, wherein said steps of processing one or more of said selection operations, applying and converting are performed if said SPC view comprises at least one selection operation.

7. The method of claim 1, wherein said step of processing one or more of said Cartesian product operations is performed if said SPC view comprises at least one Cartesian product operation.

8. The method of claim 1, wherein said step of processing one or more of said projection operations is performed if said SPC view comprises at least one projection operation.

9. A system for computing propagation covers of conditional functional dependencies using an SPC view of a dataset, wherein said SPC view comprises one or more of selection, projection and Cartesian product (SPC) operations, comprising: a memory; and at least one processor, coupled to the memory, operative to:
obtain a plurality of said conditional functional dependencies defined over a schema for said dataset, wherein said conditional functional dependencies comprise one or more constraints that data in said SPC view must satisfy;
process one or more of said selection operations in said SPC view to extract one or more equivalence classes;
process one or more of said Cartesian product operations in said SPC view to obtain a renamed set of said plurality of conditional functional dependencies, wherein said renamed set comprise conditional functional dependencies having attributes appearing in said SPC view;
apply one or more domain constraints from said one or more equivalence classes to said renamed set to remove one or more attributes not in said SPC view;
process one or more of said projection operations in said SPC view using a reduction by resolution procedure to identify one or more inferences that is propagated to said SPC view from said one or more conditional functional dependencies having attributes that do not appear in said SPC view;
convert one or more domain constraints of said equivalence classes to conditional functional dependencies; and
determine a cover of said SPC view, wherein said cover comprises a set of conditional functional dependencies propagated from a set of said obtained conditional functional dependencies using said SPC view.

10. The system of claim 9, wherein said cover of said SPC view is a minimal cover of said SPC view.

11. The system of claim 9, wherein said processor is further configured to determine if two or more of said conditional functional dependencies are inconsistent.

12. The system of claim 9, wherein said obtained plurality of conditional functional dependencies are a minimal cover of conditional functional dependencies.

13. The system of claim 9, wherein said processing of one or more of said selection operations in said SPC view further comprises handling one or more inconsistencies in said equivalence classes and returning at least one set of conflicting conditional functional dependencies if said equivalence classes are inconsistent.

14. An article of manufacture for computing propagation covers of conditional functional dependencies using an SPC view of a dataset, wherein said SPC view comprises one or more of selection, projection and Cartesian product (SPC) operations, comprising a non-transitory computer-readable storage medium containing one or more programs which when executed implement the steps of:
obtaining a plurality of said conditional functional dependencies defined over a schema for said dataset, wherein said conditional functional dependencies comprise one or more constraints that data in said SPC view must satisfy;
processing one or more of said selection operations in said SPC view to extract one or more equivalence classes;
processing one or more of said Cartesian product operations in said SPC view to obtain a renamed set of said plurality of conditional functional dependencies, wherein said renamed set comprise conditional functional dependencies having attributes appearing in said SPC view;
applying one or more domain constraints from said one or more equivalence classes to said renamed set to remove one or more attributes not in said SPC view;
processing one or more of said projection operations in said SPC view using a reduction by resolution procedure to identify one or more inferences that is propagated to said SPC view from said one or more conditional functional dependencies having attributes that do not appear in said SPC view;
converting one or more domain constraints of said equivalence classes to conditional functional dependencies; and
determining a cover of said SPC view, wherein said cover comprises a set of conditional functional dependencies propagated from a set of said obtained conditional functional dependencies using said SPC view.

15. The article of manufacture of claim 14, wherein said cover of said SPC view is a minimal cover of said SPC view.

16. The article of manufacture of claim 14, further comprising the step of determining if two or more of said conditional functional dependencies are inconsistent.

17. The article of manufacture of claim 14, wherein said obtained plurality of conditional functional dependencies are a minimal cover of conditional functional dependencies.

18. The article of manufacture of claim 14, wherein said step of processing one or more selection operations in said SPC view further comprises the steps of handling one or more inconsistencies in said equivalence classes and returning at least one set of conflicting conditional functional dependencies if said equivalence classes are inconsistent.

* * * * *